(No Model.) 2 Sheets—Sheet 1.

H. A. SAWYER.
BINOCULAR.

No. 535,862. Patented Mar. 19, 1895.

Witnesses:
Alvan Macauley.
Geo Lewis.

Inventor
Herbert A. Sawyer.
By Frankland Jannus
Atty.

(No Model.) 2 Sheets—Sheet 2.
H. A. SAWYER.
BINOCULAR.
No. 535,862. Patented Mar. 19, 1895.
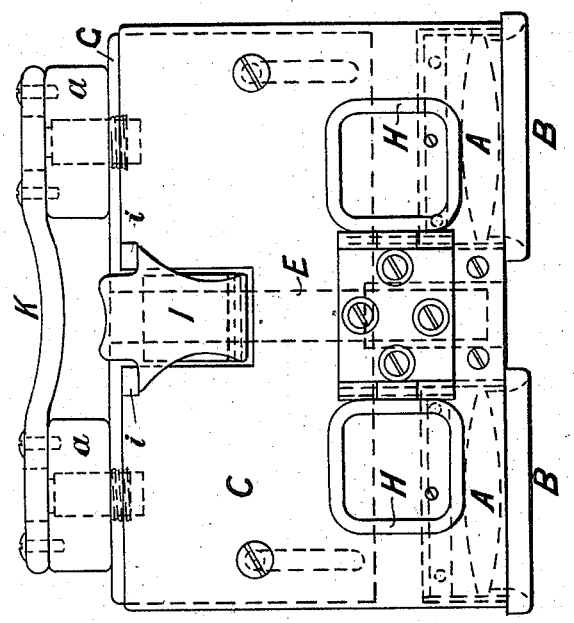
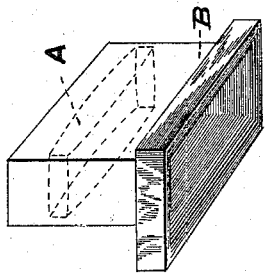
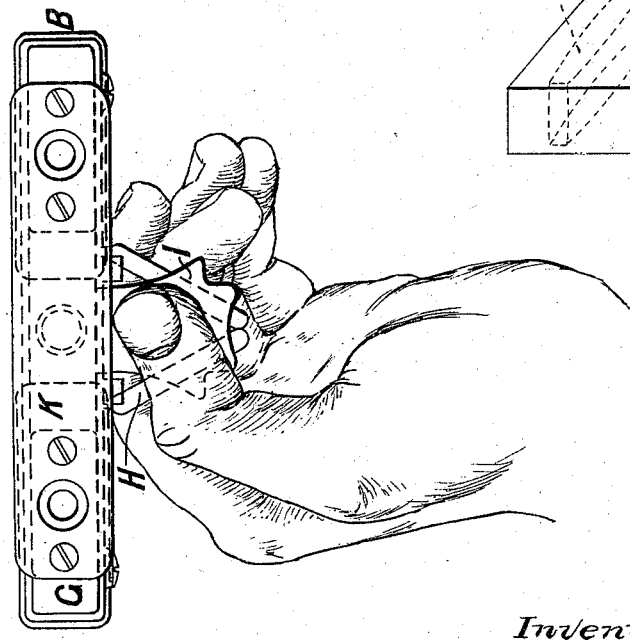
Witnesses:
Alvan Macauley.
Bruo Lewis
Inventor
Herbert A. Sawyer
By Frankland Jannus
Atty.

UNITED STATES PATENT OFFICE.

HERBERT A. SAWYER, OF LONDON, ENGLAND.

BINOCULAR.

SPECIFICATION forming part of Letters Patent No. 535,862, dated March 19, 1895.

Application filed November 18, 1893. Serial No. 491,361. (No model.)

*To all whom it may concern:*

Be it known that I, HERBERT ANTHONY SAWYER, lieutenant-colonel Indian Staff Corps, and a subject of Her Majesty the Queen of Great Britain and Ireland, residing at No. 40 Brompton Square, Brompton, London, in the county of Middlesex, England, have invented certain new and useful Improvements in Binoculars, of which the following is a specification, reference being had therein to the accompanying drawings.

My invention relates to improvements in binocular and telescopic glasses in which the adjustment of the focus is effected by operating a spring slide attached to or forming part of the eye-pieces, and its object is to facilitate the use and transport of binocular glasses. I attain this object by the arrangement illustrated in the accompanying drawings, in which—

Figure 1:
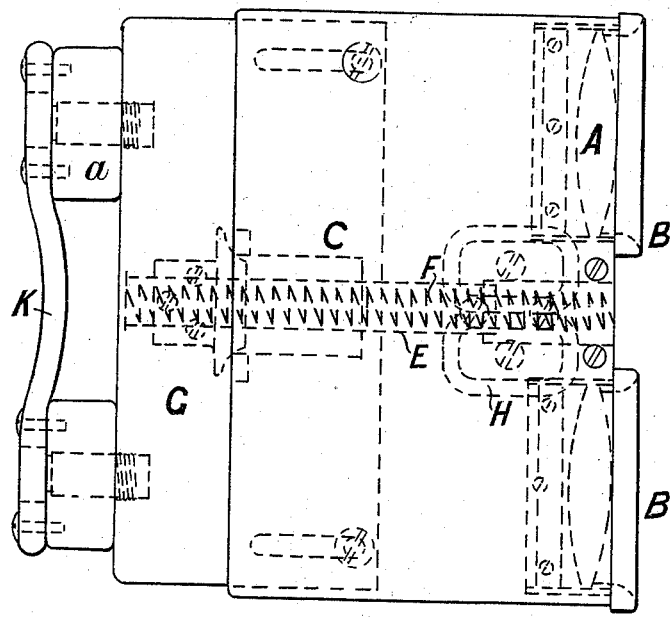
Figure 2:
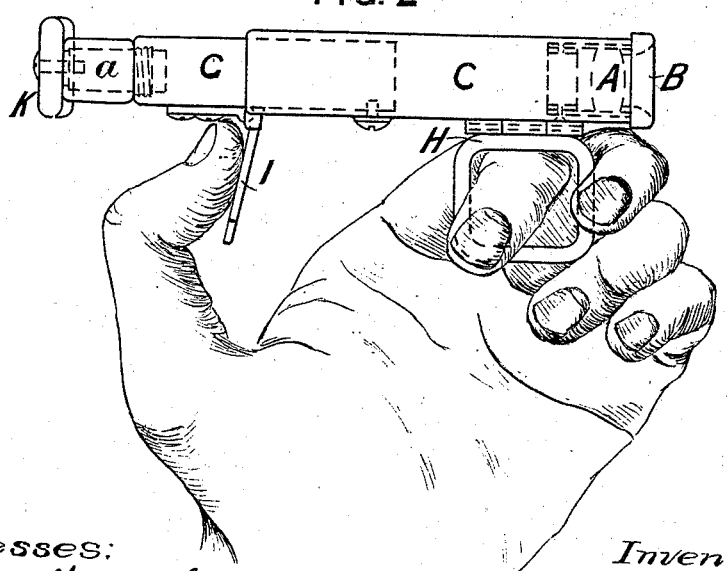

Figure 1 represents a plan of a pair of binocular field glasses constructed according to my invention, Fig. 2 being a side elevation of the same. Fig. 3 is a front or end view; Fig. 4, a plan of the above, closed up. Fig. 5 is a detail perspective of the rectangular lens tube and lens.

Similar letters refer to similar parts throughout the several views.

The case is formed of two rectangular tubes B B Fig. 5 arranged within a shell C. The object-glasses A A are made of sections cut from the center of lenses of suitable curvature in approximately the section of the tubes B B, or consisting of lentiform glasses of that shape.

Between the tubes B B and within the shell C is arranged a cylindrical tube E shown in dotted lines Figs. 1, 3, and 4, within which is a spiral spring F for operating a slide G which is attached to or forms part of the eye-pieces $a$.

H H are finger rings or handles pivoted or hinged to the shell C, and I is a lever similarly attached to the slide G and working within a slot in the tube E.

An elastic pad or cushion K may be secured to the eye pieces $a$.

By adopting this construction the glass can conveniently be slid into a belt or pocket, and will rest with sufficient steadiness in one hand when the other is otherwise engaged; while the provision of the finger rings H, lever I, and spiral-spring F enables the same hand to effect the adjustment of the focus; and the elastic pad or cushion K prevents injury to the face of the user, through any unsteadiness arising from operating the glasses with one hand.

When it is desired to use the glass—say with the left-hand—the pivoted handles or rings H are raised, and the finger then inserted within the rings H; the thumb being brought to bear upon the lever I which is connected to the slide G. Pressure of the thumb upon the lever I causes the eye-piece $a$ which is attached to the slide G, to be moved until the required focus is obtained.

The finger-rings H may be hinged or otherwise movably attached to the under side of the shell or casing C which is of a rectangular section, the outer edges whereof may be slightly rounded, the lever I being hinged or otherwise movably attached to the slide G.

The lever I is arranged to fold under and engage a suitable projection or projections $i$ on the case C when the device is collapsed, that is, when the slide G is pushed into the case C as far as it will go. The lever I then holds the slide G in such position, when the instrument occupies the smallest space, and is in most convenient form for the pocket or receptacle in which it is carried when not in use.

I may make my case of metal or of any other suitable material, and the hereinbefore described construction may be applied to instruments having one instead of two object glasses.

Instead of a strictly rectangular form the tubes B B may be made with curved edges, the object-glasses A A being then made of a corresponding form.

What I claim as my invention, and desire to secure by Letters Patent, is—

1. The combination with an outer shell and a slide moving telescopically with respect thereto, said shell and slide provided with lenses, of folding finger rings attached to the shell, a folding adjusting and locking lever secured to and moving with the sliding part, and a spring between the shell and slide normally acting to separate the parts.

2. In a binocular glass, the combination with the outer shell and a slide moving telescopically with respect thereto, of folding finger rings attached to the shell, a folding adjusting lever secured to and moving with the sliding part, and a spring between the shell and slide normally acting to separate the parts.

3. In a binocular glass, the combination of a rectangular outer shell and rectangular lenses fitted thereto, a rectangular slide carrying the eye-pieces and moving telescopically with respect thereto, folding finger-rings attached to the shell, a folding adjusting-lever secured to and moving with the sliding part, and a spring between the shell and slide normally acting to separate the parts.

4. In a binocular glass, the combination of a rectangular shell carrying the lenses, a rectangular slide adapted to move telescopically within the shell and carrying the eye-pieces, a central spring engaging the shell and slide and acting to operate them, folding finger-rings secured to the shell, and a folding adjusting-lever secured to and moving with the slide.

5. In a binocular glass, the combination of a rectangular flattened outer shell provided with finger-rings adapted to be folded down against said shell and also formed with a slot adjacent to the finger-rings, a slide carrying the eye-pieces and moving telescopically within the shell and provided with a folding lever I extending through the slot in the shell and adapted when folded into said slot to lock the parts together in their closed position and when unfolded to constitute a lever for adjusting the focus of the glasses, and a central spring between the shell and slide, normally acting to separate the parts.

In testimony whereof I affix my signature in presence of two witnesses.

HERBERT A. SAWYER.

Witnesses:
GEORGE W. WHITTON,
WILMER M. HARRIS.